July 18, 1933.  E. A. ALLIOTT  1,919,085

LEAF FILTER

Filed June 24, 1930  8 Sheets-Sheet 1

INVENTOR
EUSTACE A. ALLIOTT
by his attorneys
Howson and Howson

July 18, 1933.  E. A. ALLIOTT  1,919,085
LEAF FILTER
Filed June 24, 1930   8 Sheets-Sheet 3

INVENTOR
EUSTACE A. ALLIOTT
by his attorneys
Howson and Howson

July 18, 1933. E. A. ALLIOTT 1,919,085
LEAF FILTER
Filed June 24, 1930 8 Sheets-Sheet 4

INVENTOR
EUSTACE A. ALLIOTT
by his attorneys
Howson and Howson

July 18, 1933.    E. A. ALLIOTT    1,919,085
LEAF FILTER
Filed June 24, 1930    8 Sheets-Sheet 5

INVENTOR
EUSTACE A. ALLIOTT
by his attorneys
Howson and Howson July 18, 1933.  E. A. ALLIOTT  1,919,085
LEAF FILTER
Filed June 24, 1930  8 Sheets-Sheet 6

INVENTOR
EUSTACE A. ALLIOTT
by his attorneys
Howson and Howson

INVENTOR
EUSTACE A. ALLIOTT
by his attorneys
Howson and Howson

Patented July 18, 1933

1,919,085

UNITED STATES PATENT OFFICE

EUSTACE ALEXANDER ALLIOTT, OF AMERSHAM, ENGLAND

LEAF FILTER

Application filed June 24, 1930, Serial No. 463,460, and in Great Britain August 15, 1929.

This invention relates to filters having a number of vertical filter leaves carried in a casing, and has for its object to provide an improved construction of filter of the aforesaid kind which occupies less floor space relatively to its capacity than filters as hitherto constructed and wherein access to the whole exterior surface of the filter leaves may be had in order to facilitate inspection, cleaning and the removal therefrom, by scraping, or otherwise, of the cake deposited thereon.

According to the primary feature of this invention, there is mounted within the filter casing a header, having a number of filter leaves secured thereto, in such manner that the said header and leaves can be drawn as a unit through a door opening in the said casing so that when withdrawn access to the whole of the exterior surfaces of the said leaves can be obtained from the front of the filter. The invention also comprises improvements in the filter leaves which, in order that the filter shall occupy less floor space than known filters of equal capacity, are made substantially longer vertically than hitherto, improvements in other elements of the filter and in the provision of door closing and locking means, all as hereinafter described with reference to the accompanying drawings, in which:—

In Figures 6 and 7 the door of the casing is shewn in its closed position. Figure 13 and Figures 15 and 16 are sections of portions of the locking means taken on the lines F, F, and G, G, respectively, of the said Figure 13.

Figure 1:
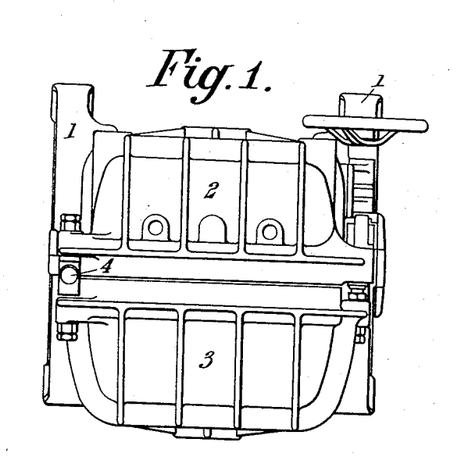
Figure 1 shews in plan a leaf filler embodying this invention in its closed, or normal position, and Figure 2 shews in side elevation, partly in section, and Figure 4 in plan the said filter open and the filter leaves withdrawn through the door opening.
Figure 2:
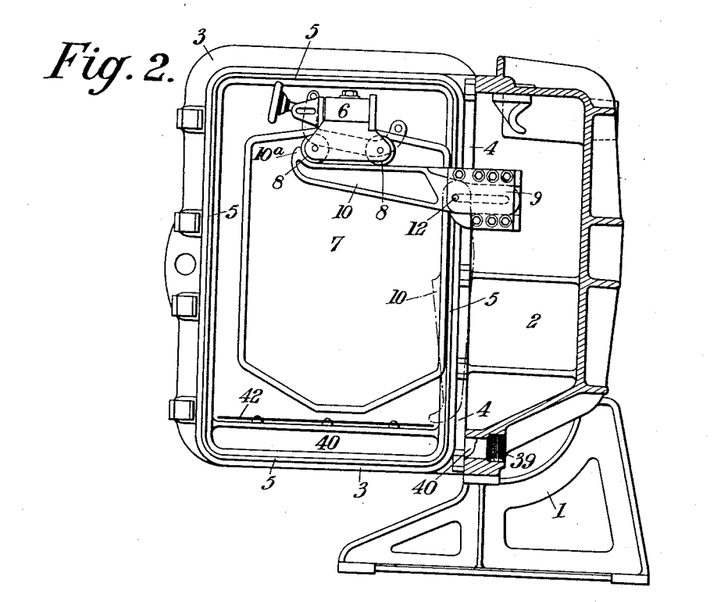
Figure 4:
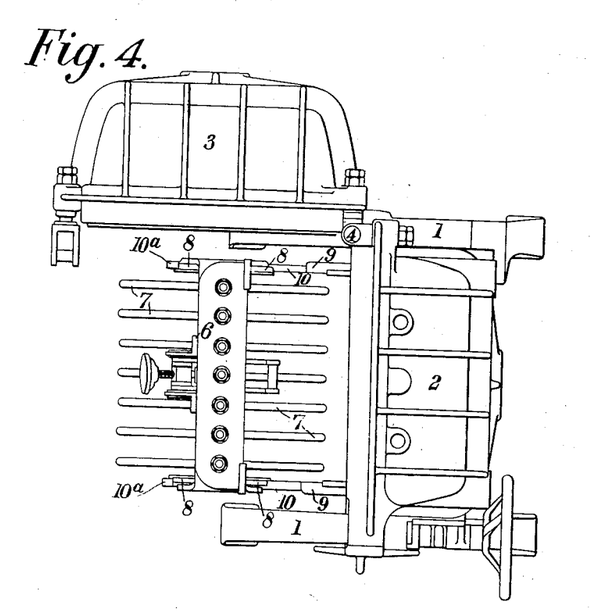

The filter shewn comprises standards 1 to which is secured a casing 2 provided with a door 3 mounted on hinges 4 so that it can be swung on a vertical axis into the open, or closed position, suitable packing material 5 being interposed between the abutting surfaces of the said door and casing to effect a liquor tight joint between the surfaces when the door is closed. A header 6 having filter leaves 7 secured thereto and into which the filtrate passes is mounted within the casing 2 in such manner that when the door 3 is open, the said header together with the filter leaves can be withdrawn as a unit from the casing (as shown in Figures 2 and 4) to permit of access to the whole of the exterior surfaces of the filter leaves so that the said surfaces can be easily inspected and cleansed and the deposited cake can be removed therefrom with greater facility than hitherto. Any suitable means may be provided for supporting the header 6, with the filter leaves 7 secured thereto, within the casing 2 and manually or other operable means may, if desired, be provided for drawing the header and filter leaves through the door opening of the said casing. In the construction shewn more particularly in Figures 2, 4, 5 and 6, the header 6 is provided with wheels 8 which run on rails 9 secured to the casing 2, the said rails constituting the supporting means when the header and filter leaves are in their normal, or operative, position. Pivotally mounted to the rails 9 are side-arms 10, normally housed within the casing 2, which can be turned into and out of operative position so that after the door 3 has been opened they can be turned into position to support the header 6 with the filter leaves 7 when withdrawn from the casing and after the header and filter leaves have been returned to their normal position within the casing, the said side-arms can be turned into their inoperative position so that the door can be again closed. Preferably the side-arms 10 are each formed with a slot 11 (see Figure 5) through which is passed the pivot pin 12 upon which the arm turns and hangs vertically within the casing 2 when not in use as shewn in Figures 5 and 9. When the door 3 is opened the side-arms 10 can be turned on the pivot pins 12 into a horizontal position and by reason of the slots 11 can be pushed back so as to engage stops, or members, which hold the arms in the horizontal position. These stops, or members, are shown in Figures 7 and 9 as being constituted by the upper and lower walls 9a and 9b of a recess 9c formed in the inner face of each of the rails 9 within which recess the inner ends of the respective side-arms 10 are adapted to slide when in the raised, or operative, position. A guard plate 13, secured to the respective rails 9, acts to prevent sideway movement of the side-arms 10 in the recesses 9c. The side-arms when in the raised, or operative, position constitute extensions of the rails 9 upon which the wheels 8 run and support the header 6 with the filter leaves 7 when withdrawn through the door opening. In practice it has been found that when the side-arms 10 are in the horizontal, or operative, position they cannot be moved in the recesses 9c whilst carrying the header 6 and its attached filter leaves 7. If desired, however, the inner end of each of the pivotally mounted side-arms 10 may be provided with a vertically, or substantially vertically, projecting lug, or its equivalent (not shewn) so that when the side-arms are in the horizontal, or operative, position, they cannot be drawn forwardly until they are first turned on their pivots sufficiently to move the lugs, or the equivalent, out of engagement with a portion of the rails 9, and consequently accidental, or premature, movement of the said arms is prevented. If desired the side-arms 10 may be provided with means (not shewn) which constitute a guard, or stop, for the outer ends of the rails 9 when the said arms are in their lowered, or inoperative position to prevent accidental withdrawal of the header 6 and the filter leaves 7. The outer ends of the side-arms 10 are shewn adapted to constitute stops 10a with which the forward wheels 8 of the header 6 suddenly engage, or abut, at the end of the outward movement of the said header so that by the impact any deposit carried by the filter leaves 7 will be displaced therefrom.

Figure 5:
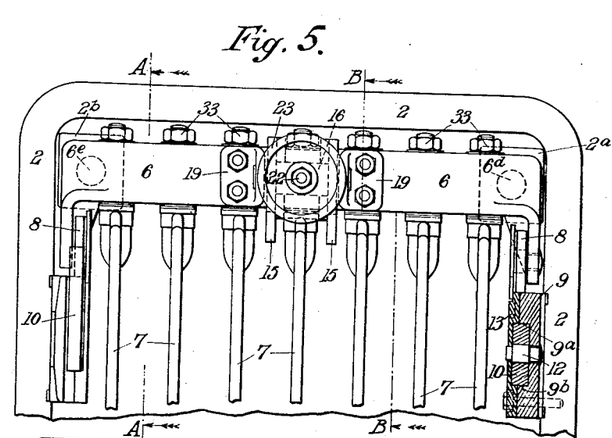
Figure 5 shews in front elevation, with parts in section, the upper portion of the filter casing with the header and filter leaves therein, the supporting means for the said header and means for locking the said header in its normal, or operative, position, the door of the said casing being presumed to be removed.
Figure 6:
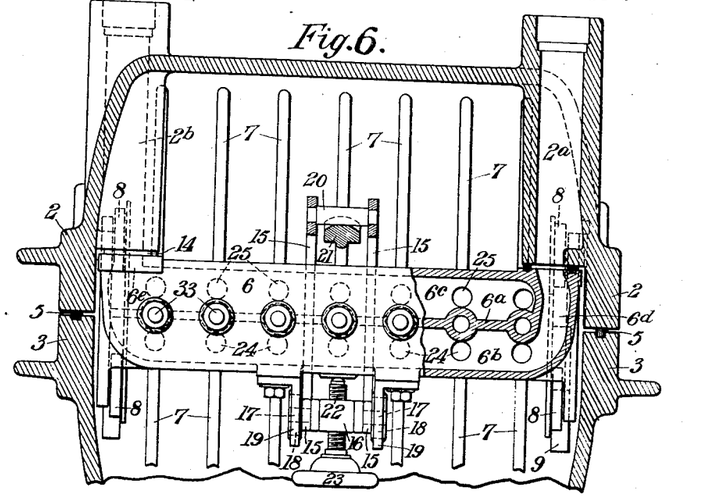
Figure 6 is a plan, with parts in section, of Figure 5.
Figure 7:
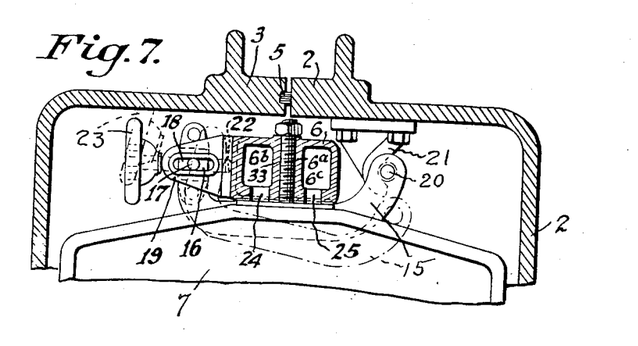
Figure 7 is a section taken on the line B—B of Figure 5.
Figures 8, 9, 10, 11, 12:
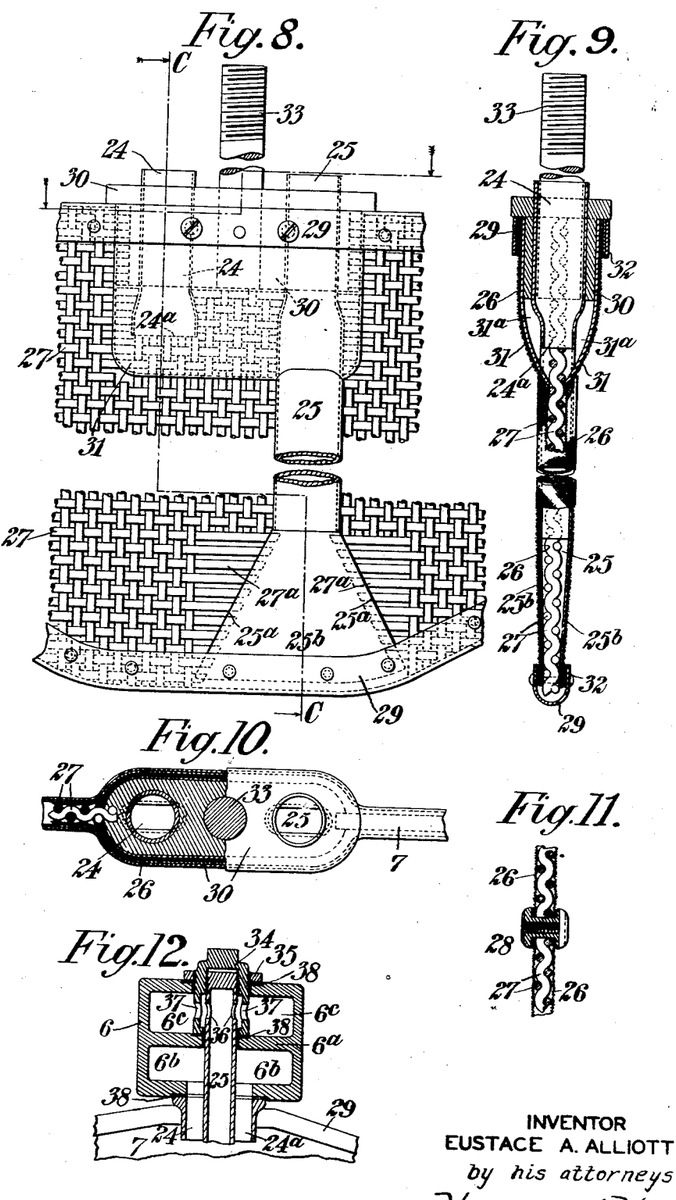
Figure 8 is a fragmentary elevation of a preferred construction of filter leaf.
Figure 9 is a section taken on the line C—C, Figure 8.
Figure 10 is a plan with parts in section of Figure 8
Figure 11 is another fragmental section.
Figure 12 shows, in section, a modified construction of the header and arrangement of the outlet passages leading from the filter leaf.

The header 6 shewn in Figures 5, 6 and 7 is divided by a vertical partition 6a into longitudinal compartments 6b and 6c into which the filtrate passes from upper and lower portions, respectively, of the filter leaves 7, as hereinafter described. The compartment 6b has an outlet orifice 6d in communication with an outlet port 2a in the casing 2 and the compartment 6c has a similar outlet orifice 6e in communication with another outlet port 2b in the said casing. Any suitable packing material, indicated at 14 in Figure 6, may be interposed between the opposed surfaces of the outlet orifices in the header 6 and the outlet ports in the casing 2 to effect liquor tight joints when the said header is in its normal, or operative, position. Any suitable means may be provided to hold the header 6 up to the outlet ports 2a and 2b of the casing 2, for example, this may be effected by a spring, or stop, (the latter of which may be adjustable by a screw operable from the outside of the filter) on the door 3 which is adapted to force the header towards the ports and effect a liquor tight joint between the said ports and the outlet orifices 6c and 6d of the header when the door is closed. Or, if desired, this may be effected by locking gear, actuated by means operable when the door 3 is open, such, for example, as that shewn in Figures 5, 6 and 7. This locking gear comprises a pair of arms 15 secured at their outer ends to a cross-piece 16 having trunnions 17 slidable in a slot 18 in bearings 19 secured to, or formed in one with, the header 6, the inner ends of the said arms being connected by a pin 20 adapted to engage a hook 21 secured to the casing 2. Passing through a screw-threaded hole in the cross-piece 16 is a screw 22, having a handwheel 23 for turning it, which when in its normal, or operative, position abuts against the header 6. The arrangement is such that when the screw is loosened the arms 15 can be pushed rearwardly and turned to cause the pin 20 on their inner ends to disengage the hook 21 so that the header 6 can then be drawn forwardly. When, however, the header 6 is pushed rearwardly to approximately its normal, or operative position the arms 15 are turned and drawn forwardly so that the pin 20 on their inner ends engages the hook 21 and by again screwing up the screw 22 the header is forced further rearwardly so that a liquor tight joint is effected between the outlet ports 2a and 2b of the casing 2 and the outlet orifices 6c and 6d of the said header. The outlet ports 2a and 2b may be provided with controlling devices so that either or both of the ports can be used as desired.

Each filter leaf 7 may be provided with two, or more, outlet passages having their inlet orifices at different levels and discharging into separate compartments in the header 6. If desired the outlet passages may be arranged in groups, the respective groups having their inlet orifices at different levels and discharging into separate compartments in the header 6 as aforesaid, and means may be provided whereby all, or any desired number of the said outlet passages may be used simultaneously as desired. Figures 8, 9, 10 and 11 show a preferred construction of filter leaf 7 wherein the said leaf is provided with two outlet passages 24 and 25 leading into the chambers 6b and 6c respectively of the header 6 as shown in Figures 6 and 7. The filter leaf comprises two layers of fine wire mesh 26 supported on a coarse gauze 27 which provides a free passage for the filtered solvent. The wire mesh 26 and the coarse gauze 27 therebetween are secured together by means of a number of suitably spaced stays, or screw-clamps 28, one of which is shown in section in Figure 11, and the edges of the said wire mesh and coarse gauze are bound by a frame 29 riveted, or welded, thereto. The outlet passage 24 is constituted by a tube having its inlet orifice 24a towards the upper portion of the filter leaf and the outlet passage 25 is constituted by a tube having its inlet orifice 25a at the lower portion of the said filter leaf. The lower end of the tube 25 is of open fish-tail formation and consists of two plates 25b between which some of the wires of the coarse gauze project, other of the said wires being removed (as indicated at 27a in Figure 8) to permit of free entry of the filtered solvent between the said plates. The upper ends of the outlet tubes 24 and 25 pass through an elongated boss 30 surrounded by a guard 31 under the wire mesh 26, the said guard being bulged outwardly from the coarse gauze 27 in such manner as to provide a space 31a round the tube 25 for the passage of the filtered solvent to the orifice 24a of the tube 24. A lining 32 of asbestos or other suitable material, held by the frame 29 ensures a fluid tight joint between the boss 30 and the said frame. The boss 30 is provided with a stud 33 by means of which the filter leaf is secured to the header 6 as shown more clearly in Figure 7. The arrangement of the inlet orifices of the outlet passages at different levels permits air to escape freely, during filtration, through the outlet passage having its inlet orifice at high level and the outlet passage having its inlet orifice at low level permits the bulk of the filtered solvent to be forced through the filter leaf before the door 3 of the casing 2 is opened so that only a small quantity of unfiltered solvent remains to be drained. The filter could be partially drained through the high level outlet passage only, but in this case some of the liquor would be left between the fine wire mesh 26 and the coarse gauze 27 so that the deposit on the filter leaf would never be perfectly dried, and air could escape through the low level outlet passage but less readily owing to the pressure of the head of liquor between the said fine wire mesh 26 and the coarse gauze 27. Moreover the provision of outlet passages having their inlet orifices at, or towards, the upper end and lower end respectively of the filter leaf provides a freer escape for the filtered solvent, and in some cases is essential for large high leaves. It also enables cleansing liquor to be forced downwardly and upwardly through the filter leaf, in the reverse direction to the flow of filtrate, so that it can be more efficiently and quickly cleansed of deposit left within the wire meshes. Instead of the outlet tubes 24 and 25 being in direct communication with the header 6 as hereinbefore described they may communicate indirectly therewith, through any suitable means, either collectively or in groups. By the construction and arrangement hereinbefore described and illustrated all inlet and outlet orifices through which the liquor passes are independent of the door 3 of the filter.

If desired the filter leaves may be covered with cloth bags and the upper end of the boss 30, above guard 31 may be provided with a groove, not shown, in which the edges of the opening in the bag corresponding to the boss 30 may be bound with twine, wire or the like. Alternatively the upper portion of the boss 30 may consist of a removable flange through which the ends of the outlet tubes 24 and 25 pass. The opening in the cloth bag is made large enough to pass over the tubes 24 and 25 but smaller than the loose flange, which is placed in position over it and screwed, or clamped, down to make a joint. The bottom of the cloth bag is left open, and sewn up in the usual manner after it has been placed over the filter leaf. When such cloth bags are employed the fine outer wire cloths 26 will usually be omitted.

Instead of arranging the outlet tubes 24 and 25 of the filter leaf 7 at diametrically opposite sides of the securing stud 33 as hereinbefore described and illustrated they may, if desired, be arranged concentrically with respect to each other and centrally of the filter leaf as shewn in Figure 12. In this alternative arrangement the outlet tube 24 is situated centrally of the filter leaf 7 and is of substantially large diameter relative to the diameter of the outlet tube 25 the upper portion of which is passed through the said tube 24. The header 6 is divided, by a horizontal partition 6a, into lower and upper compartments 6b and 6c, respectively, into the former of which filtered solvent from the upper portion of the filter leaf 7 passes through the outlet tube 24. The upper portion of the outlet tube 25 extends upwardly through the lower compartment 6b, the horizontal partition 6a and the upper compartment 6c of the header 6 and has a cap 34 screwed onto its upper end, which projects downwardly through an orifice in the upper wall of the header and abuts onto the upper surface of the partition 6a of the said header in such manner that, in conjunction with the outlet tube 25, it constitutes the means for securing the filter leaf to the header. A locknut 35 screwed onto the outwardly projecting portion of the cap 34 and abutting onto the upper surface of the header 6 ensures security of connection of the aforesaid elements. The outlet tube 25 and the cap 34 are provided with openings 36 and 37, respectively, by which communication between the interior of the said tube and the upper chamber 6c of the header 6 is effected. Packing indicated at 38, of any suitable material, such for example as asbestos, may be interposed between the opposed surfaces of the outlet tube 24 and the header 6, the cap 34 and the said header and the locknut 35 and the said header to effect a liquor-tight joint.

Figure 3:
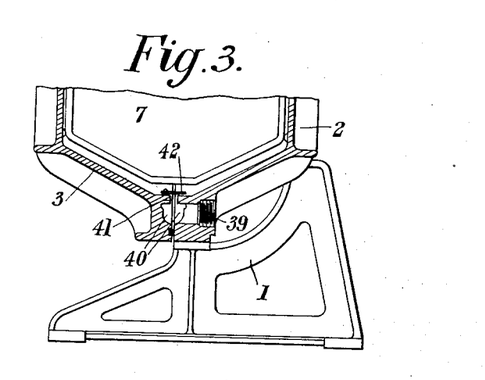
Figure 3 is a detail shewing the inlet orifice and passage for liquor to the interior of the filter casing and the means, shewn also in Figure 5, for distributing the incoming liquor outwardly from the said passage; the door of the casing in this Figure 3 being in the closed position.

The liquor to be filtered is conveyed to an inlet passage 39 (see Figures 2 and 3) in a part of the casing 2 below the filter leaf 7, and passes therefrom to a passage 40 formed in the opposed surfaces of the said casing and the door 3 and from thence through a gap 41, between the said opposed surfaces, with which gap the said passage communicates. Secured to the casing 2, or preferably to the door 3 as shewn, at a suitable distance above the gap 41 is a deflecting plate, or spreader, 42 which acts to distribute the incoming liquor outwardly from the said gap so that it does not wash any deposit from the filter leaves 7 but removes any matter that may have settled at the bottom of the casing 2 and the door 3. The passage 40, gap 41 and deflecting plate, or spreader, 42, is preferably of a length equal, or approximately equal, to the width of the interior of the casing 2 and the door 3. By this arrangement when the door 3 is open, uninterrupted access may be had to the bottom of the casing 2, the underside of the deflecting plate, or spreader, 42 and to the passage 40 whereby the cleaning thereof can be easily and efficiently effected.

Figures 13, 14:
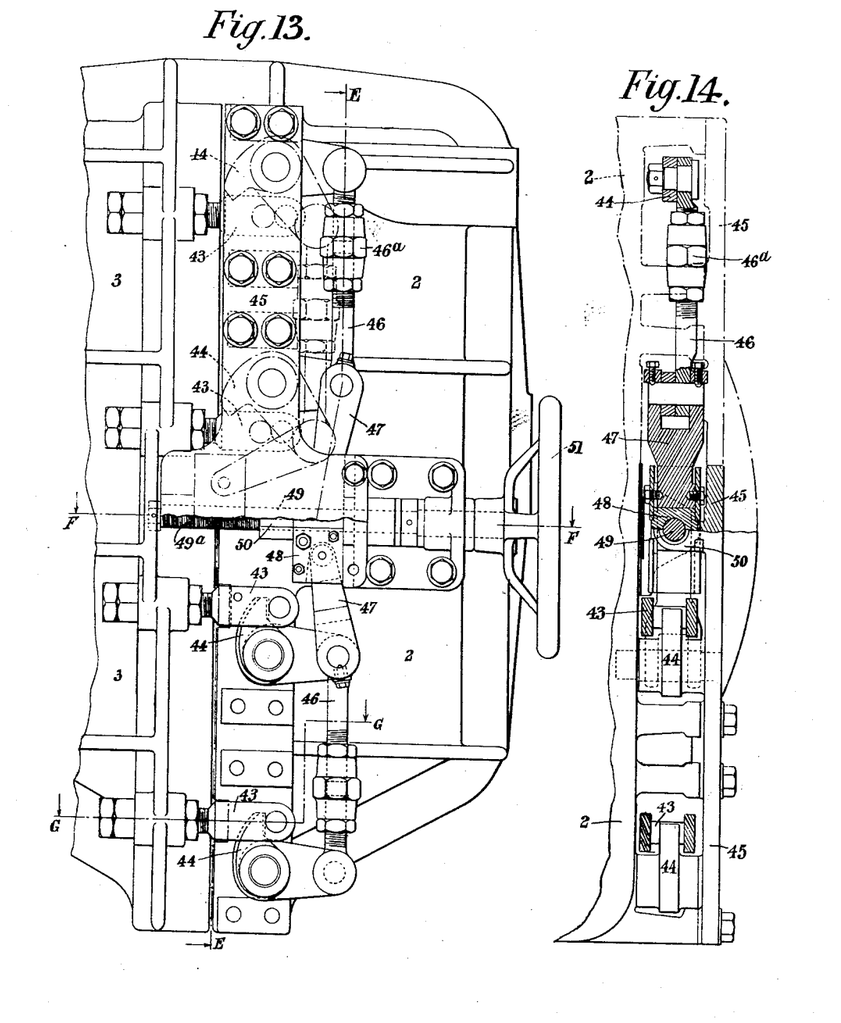
Figure 13 is an elevation of fragments of the casing and a portion of the door shewing means for locking the door when in its closed position.
Figure 14 is a section taken on the line E, E.
Figure 15:
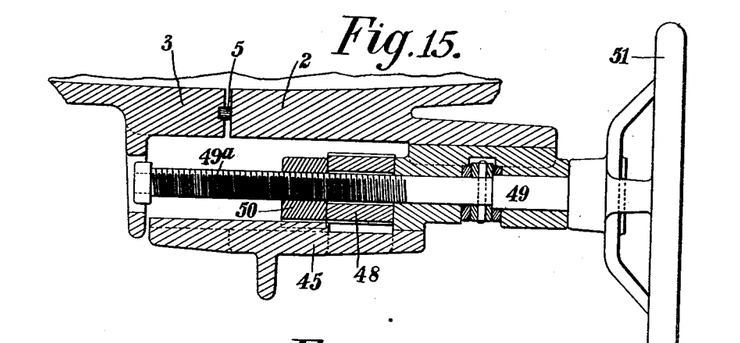

Leaf filters comprising a casing 2 and a door 3 hinged thereto may, if desired, be provided with means on the said casing and door, respectively, which are adapted to automatically engage and disengage upon the closing and opening of the door and also with means which are adapted to prevent, when desired, disengagement of the first-mentioned means and to put pressure on it so that the door can be locked and tightened in its closed position. This may be effected as shewn more clearly in Figure 13, by providing the door 3 with shackles 43 which are adapted to engage hooks 44, pivotally mounted between the casing 2 and a plate 45, upon the closing of the door 3. In the example shewn four inter-engaging shackles 43 and hooks 44 are employed and the latter are connected at their tail ends in pairs by links 46. The free ends of the links 46 are connected to the outer ends of toggle levers 47 the inner ends of which are pivotally connected to a piece 48 slidable on a rod 49 rotatably mounted in bearings on the casing 2. The shackles 43 and the hooks 44 are so adapted and arranged that during the closing movement of the door 3 the said shackles engage the hooks and turn the latter and the toggle levers 47 in such manner that the piece 48 is slid along the rod 49 in a direction away from the door opening of the casing 2 in the arrangement shewn in Figure 13. A non-rotatable nut 50 threaded on a screw-threaded portion 49a of the rod 49 is then caused, by the rotation of the said rod, to travel therealong into engagement with the slidable piece 48 and thereby acts to prevent movement of the said piece in the opposite direction so that the door 3 is securely locked. Further rotation of the rod 49 in the same direction causes the non-rotatable nut 50 to press with sufficient force upon the slidable piece 48 that, through the toggle levers 47 and links 46, the hooks 44 are turned on their pivots and by their engagement with the shackles 43 cause the door 3 to close tightly against the casing 2. The rod 49 has a handwheel 51 secured to its outer end for rotating it. When it is required to open the door 3, the rod 49 is rotated in the direction to cause the nut 50 to travel from the slidable piece 48 to permit the latter returning a sufficient distance towards the door 3. The door 3 can now be swung open and during its initial movement the shackles 43 turn the hooks 44 and the toggle levers 47 so that the latter move the slidable piece 48 towards the door opening and upon further movement of the said door the said shackles become disengaged from the said hooks. During the closing movement of the door 3 the shackles 43 first contact with the tails of the hooks 44 and turn the said hooks on their pivots so that they engage with the openings in the said shackles and the door is held sufficiently to maintain it in the closed position until the handwheel 51 is operated to lock the door in the closed position as aforesaid.

If desired, the rotatable rod 49 may operate a nut having the toggle levers 47 attached thereto so that the movement of the hooks 44 is controlled by the handwheel 51, and also, if desired instead if the beforementioned piece 48 sliding along the rotatable rod 49 in a direction away from the door opening during the closing of the door, it may slide along the said rod in the opposite direction. It is preferred, however, to slide the said piece along the rod in a direction away from the door opening as hereinbefore described.

Figure 16:
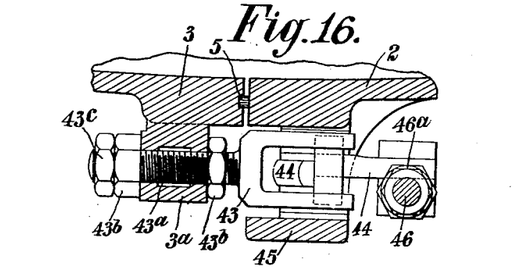
Figure 17:
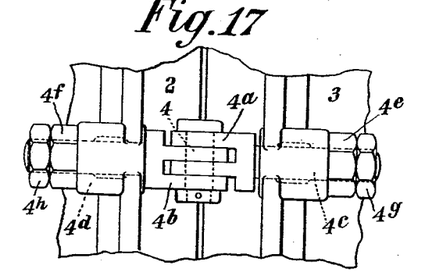
Figure 17 is an elevation of a fragment of the hinged side of the filter casing and door shewing one of the hinges and Figure 18 is a plan thereof.
Figure 18:
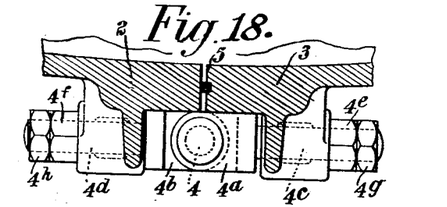

Means may be provided for separately adjusting the hooks 44, or some of them, relatively to the toggle levers 47 so that equal movement of all the hooks can be easily obtained. This may be effected by forming the links 46, connecting the pairs of hooks 44, in two parts and connecting them by a right and left handed screw-threaded union 46a, so that by turning the said union in one direction or the other, the length of the said links can be virtually shortened, or lengthened. Further the shackles 43 may, if desired, be adjustably mounted on the door 3 of the casing 2 in such manner that they can be arranged initially to engage equally to with all the hooks 44. This may be effected as shewn more clearly in Figure 16, by providing each shackle 43 with a screw-threaded stem 43a which is passed through a lug 3a on the door 3 and can be adjusted longitudinally therein by nuts 43b and secured by a locknut 43c. This arrangement also permits the door locking gear to be adjusted to suit the thickness of the packing material 5 between the casing 2 and the door 3. The hinges of the casing 2 and the door 3 may, if desired, be adjustably mounted in a similar manner to the shackles 43, as shewn in Figures 17 and 18 wherein the members 4a and 4b of the hinge are provided with screw-threaded stems 4c and 4d respectively, which pass through lugs on the said casing and door and can be adjusted longitudinally therein by nuts 4e and 4f and secured by lock nuts 4g and 4h.

Figure 19:
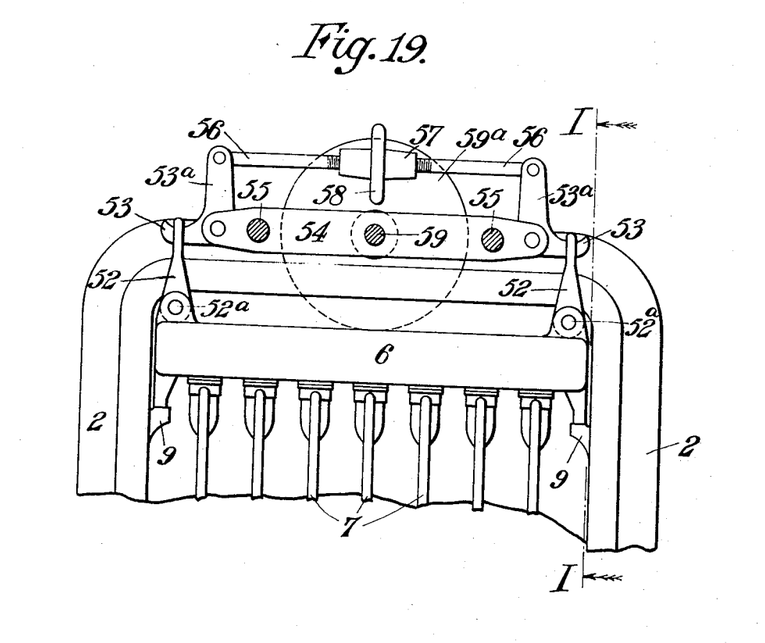
Figures 19 and 20 are elevations at right angles to each other of a fragment of the filter casing, partly in section taken on the lines H, H, and I, I, of Figures 19 and 20 respectively, shewing an alternative means for supporting the header and filter leaves attached thereto and also manually operable means for moving the said header and filter leaves through the door opening of the filter casing.
Figure 20:
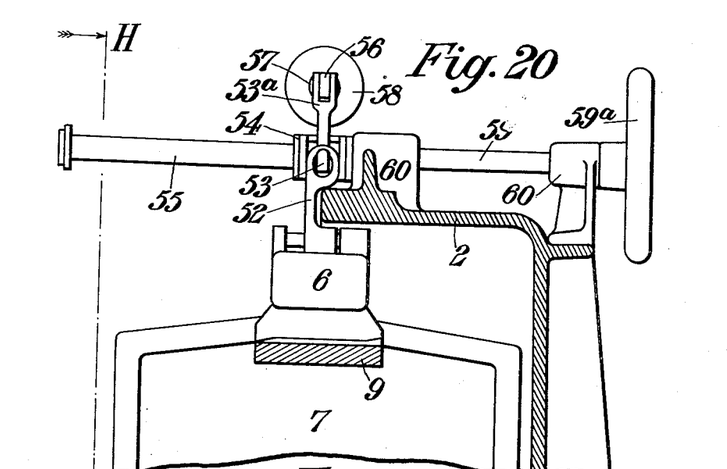
Figure 21:
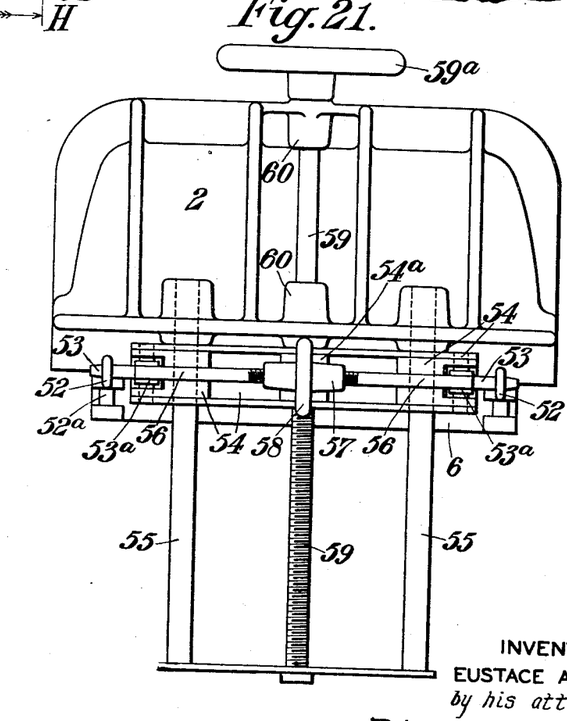
Figure 21 is a plan of Figure 19.

Instead of supporting the header 6 and the filter leaves 7, when withdrawn as a unit through the door opening of the casing 2, on movable side arms which are housed within the said casing when the said header and filter leaves are in their normal position within the casing as hereinbefore described, the said header and filter leaves may be suspended from and be movable along rods, or the equivalent, secured to the top of the said casing and overhanging the door opening therein, and manually operable means may be provided for moving the said header, with the filter leaves, along the said rods, or the equivalent, into and out of operative position. This may be effected as shown in Figures 19, 20 and 21 wherein the header 6, with the attached filter leaves 7, is supported on rails 9, attached to, or cast in one with, the said walls of the casing 2, when in its normal, or operative, position within the said casing. Pivotally mounted at, or towards, the ends of the header 6 and on the upper side thereof, are links 52 which can be turned on their pivots so as to lie, when desired, on the upper surface of the said header clear of the casing 2, or to project upwardly, when desired, to engage hooks 53 pivotally mounted on a carrier 54 slidable on rods 55 secured to the top of the said casing. The tails 53a of the hooks 53 are connected by a tie rod 56 made in two parts joined by a right and left handed screw-threaded union 57 provided with a handwheel 58 for turning it, so that by turning the said union in one direction or the other the length of the said tie-rod is virtually shortened, or lengthened, and in consequence the said hooks are turned on their pivots in a direction in accordance with whether the tie-rod is shortened, or lengthened. As aforesaid, the links 52 lie on the upper surface of the header 6 when the latter is in its normal, or operative, position within the casing 2. When it is required to withdraw the header through the door opening of the casing 2 the links 52 are turned and slid on their pivot pins 52a in position to be engaged by the hooks 53 which is effected by turning the handwheel 58 in the direction to cause the said hooks to turn on their pivots and enter the eyes of the said links. The hooks 53 are then turned in the direction to raise the header 6 slightly off the rails 9 so that the weight of the said header and the filter leaves 7 is now borne, through the carrier 54 to which the hooks are pivoted, by the rods 55. The carrier 54, with the header 6 and filter leaves 7 suspended therefrom can now be slidden on the rods 55, preferably by manually operable means, so as to draw the said header and filter leaves through the door opening of the casing 2. The manually operable means for sliding the carrier 54 on the rods 55 may comprise, as shown, a nut 54a secured to, or integral with, the said carrier, in engagement with a longitudinally immovable screw-threaded shaft 59 mounted in bearings 60 on the casing 2 and provided with a handwheel 59a for turning it.

Means, not shown, may be provided for steadying the filter leaves and header when in the raised position. This may, for example, consist of rods pivoted to the ends of the rods 55 or to arms rigidly attached to the carrier 54 and extending in front of it above the level of the door. These rods carry hooks or other attachments which are adapted to be swung down when the door 3 is opened and to engage with the forward edges of the filter leaves which are provided with eyes, pins rods, or the like, suitable for engaging with the said pivoted rods.

It is obvious that in a large filter the ends of the rods 55 may be tied together and secured by a rod or rods extending above them and clear of the carrier 54 and tie rod 56, such rods being secured to a lug or lugs projecting upwardly from the casing 2 in such a manner that the rods 55 are given additional support.

What I claim is:—

1. A leaf filter having a casing with a door normally closing it and a header mounted independently of said door, in combination with a number of filter leaves secured to said header, rails for supporting said header and filter leaves for movement relative to said casing and door, whereby the header with its filter leaves thereon can be drawn out on the rails as a unit after the door is opened.

2. A leaf filter having a casing with a door normally closing it and a header through which the filtrate is discharged, in combination with a number of filter leaves secured to the header, wheels on which the header is mounted, and rails on which said wheels roll for movement of said header relative to said door, said header being mounted independently of said door whereby the header with its leaves thereon can be drawn out on the rails as a unit when the door is opened.

3. A leaf filter having a casing with a door normally closing it and a header through which filtrate is discharged, in combination with a number of filter leaves secured to the header, wheels on which the header is mounted and rails on which said wheels roll comprising fixed portions for supporting the header with the filter leaves inside the casing, and movable portions adapted to constitute extensions of said fixed portions for supporting said header and filter leaves when withdrawn through the door opening.

4. A leaf filter having a casing with a door normally closing it and a header through which filtrate is discharged, in combination with a number of filter leaves secured to the header, wheels on which the header is mounted and rails on which said wheels roll comprising fixed portions for supporting the header with the filter leaves inside the casing, stops, and side arms having a pin and slot connection to said casing which permits said arms to hang down in their inoperative position, and to be turned into operative position to form an extension of said fixed portions, and to be pushed back into engagement with said stops for retaining them in said operative position.

5. A leaf filter having a casing with a door normally closing it, and a header through which filtrate is discharged, in combination with a number of filter leaves secured to the header, wheels on which the header is mounted and rails on which said wheels roll comprising fixed portions for supporting the header with the filter leaves inside the casing, and movable portions adapted to constitute extensions of said fixed portions for supporting said header and filter leaves when withdrawn through the door opening, and stops on the outer ends of said extensions, with which stops the header suddenly engages in its outward movement so that the impact causes deposit on the filter leaves to be displaced therefrom.

6. In a leaf filter having a casing with a door normally closing it, a header through which the filtrate is discharged, a number of filter leaves secured to the header, and fixed rails for supporting the header within the casing, the combination with fixed rods on the exterior of the casing of a carrier slidable on said rods and means for connecting said carrier to said header, whereby said header can be raised from and be lowered onto the fixed rails within the casing.

7. In a leaf filter having a casing with a door normally closing it, a header through which the filtrate is discharged, a number of filter leaves secured to the header, and fixed rails for supporting the header within the casing, the combination with fixed rods on the exterior of the casing of a carrier slidable on said rods, links pivoted to said header, hooks pivoted to said carrier adapted to engage said links, and means connected to the tails of the hooks for turning said hooks on their pivots, whereby said header can be raised from and be lowered onto the fixed rails within the casing.

8. In a leaf filter having a casing with a door normally closing it, a header through which the filtrate is discharged, a number of filter leaves secured to the header, and fixed rails for supporting the header within the casing, the combination with fixed rods on the exterior of the casing, of a carrier slidable on said rods, means for sliding said carrier along the rods on the exterior of the casing, and means whereby said header can be raised from and be lowered onto the fixed rails within the casing.

9. A leaf filter comprising a casing having a door opening, supporting means in said casing, a header engaging said supporting means, and filter leaves carried by said header, said header with the filter leaves thereon being movable with respect to said supporting means and door whereby said header and leaves may be drawn as a unit through said door opening, supporting means exterior of said casing, and means supported thereby for raising said header off the interior supporting means, whereby said unit may be supported by said exterior supporting means.

10. A leaf filter comprising a casing having a door opening, supporting means in said casing, said casing being provided with outlet passages having ports inside said casing, a header engaging said supporting means and having outlet ports registering with those of said casing, filter leaves carried by said header, means for holding said header and casing ports in substantially fluid tight engagement, said holding means being releasable, and said header being movable with respect to said supporting means, whereby said header and leaves may be drawn as a unit through said door opening.

11. In a leaf filter, a casing having ports inside the same, supporting means in said casing, a header movably supported by said supporting means and having ports registering with the casing ports, a hook in said casing, a cross piece, arms having outer ends secured to said cross piece and inner ends adapted to engage said hook, and a screw passing through said cross piece for forcing said header inwardly to bring the opposed surfaces of said ports of the header and casing into substantially fluid tight engagement.

12. In a leaf filter, a casing having ports inside the same, supporting means in said casing, a header movably supported by said supporting means and having ports registering with said casing ports, means for bringing the opposed surfaces of said ports of the header and casing into substantially fluid tight engagement, a door for said casing, said casing and door having opposed surfaces, said opposed surfaces of said casing and door having an inlet passage formed therein leaving a gap, and a deflector mounted above the said gap and adapted to distribute the incoming liquor outwardly therefrom.

13. A leaf filter having a casing with a door normally closing it and a header, in combination with a number of filter leaves secured to said header, rails for supporting said header and filter leaves for movement relative to said casing and door, whereby the header with its filter leaves thereon can be drawn out on the rails as a unit after the door is opened, inter-engaging means on the door and filter casing respectively, whereby the door can be locked in its closed position; the said means comprising a number of shackles secured to the said door and hooks pivotally mounted on the said casing with which hooks the said shackles engage and turn the hooks on their pivots during the closing movement of the door, an element slidable on a rod on the said casing, means for connecting the tails of the said hooks to the said element whereby, upon the turning of the hooks, the element is caused to slide along the said rod, and means for applying force to the said element when the said door is closed so that the door is locked and tightened in its closed position.

14. A filter leaf having outlet tubes provided with inlet orifices at different levels, and filter surfaces over said tubes, and a guard forming a passage round the tube having its inlet orifice at the low level, whereby the filtered liquor may pass within the filter surfaces from one side of the filter leaf through said passage to that side of the filter leaf in which the tube having its inlet at the high level is situated.

15. In a filter leaf, an elongated boss, outlet tubes having upper ends passing through said boss and inlet orifices at different levels, a guard surrounding said boss, a fine wire mesh and a coarse gauze between which said guard is mounted, the said guard being bulged outwardly from the said coarse gauze in such manner as to provide a space round the tube having its inlet orifice at a low level so that liquor can pass through the said space to another outlet tube the inlet orifice of which is situated within the said guard.

16. A leaf filter having filter leaves and a header having a partition dividing the same into separate compartments, a stud secured to each filter leaf and passed through the said header, each leaf having outlet passages arranged at opposite sides of the said stud and discharging respectively into said separate compartments.

17. In a leaf filter, a header having a partition dividing the same into separate compartments, filter leaves connected to said header, and means associated with each filter leaf and said header and forming concentric outlet passages connected to discharge respectively into said separate compartments.

EUSTACE ALEXANDER ALLIOTT.